US010971191B2

(12) United States Patent
Godfrey et al.

(10) Patent No.: US 10,971,191 B2
(45) Date of Patent: Apr. 6, 2021

(54) COORDINATED AUDIOVISUAL MONTAGE FROM SELECTED CROWD-SOURCED CONTENT WITH ALIGNMENT TO AUDIO BASELINE

(71) Applicant: Smule, Inc., San Francisco, CA (US)

(72) Inventors: Mark T. Godfrey, San Francisco, CA (US); Turner Evan Kirk, San Francisco, CA (US); Ian S. Simon, San Francisco, CA (US); Nick Kruge, San Francisco, CA (US)

( * ) Notice: Subject to any disclaimer, the term of this patent is extended or adjusted under 35 U.S.C. 154(b) by 445 days.

(21) Appl. No.: 14/739,910

(22) Filed: Jun. 15, 2015

(65) Prior Publication Data

US 2015/0279427 A1    Oct. 1, 2015

Related U.S. Application Data

(63) Continuation-in-part of application No. 14/104,618, filed on Dec. 12, 2013, now Pat. No. 9,459,768.
(Continued)

(51) Int. Cl.
*G10L 25/57*    (2013.01)
*G11B 27/031*    (2006.01)
(Continued)

(52) U.S. Cl.
CPC ............ *G11B 27/10* (2013.01); *G06F 3/0481* (2013.01); *G06F 16/686* (2019.01); *G10L 25/48* (2013.01);
(Continued)

(58) Field of Classification Search
CPC ......... G06F 17/30017; G06F 17/30026; G06F 17/30038; G06F 16/686; G10L 25/21;
(Continued)

(56) References Cited

U.S. PATENT DOCUMENTS 6,073,100 A * 6/2000 Goodridge, Jr. ........ G10L 21/04
704/207
7,512,886 B1 * 3/2009 Herberger .............. G11B 27/34
715/723
(Continued)

OTHER PUBLICATIONS

Wikipedia, "Optical flow", 7 pages, downloaded Jun. 3, 2020. (Year: 2020).*

*Primary Examiner* — Martin Lerner
(74) *Attorney, Agent, or Firm* — Haynes and Boone, LLP

(57) ABSTRACT

A generally diverse set of audiovisual clips is sourced from one or more repositories for use in preparing a coordinated audiovisual work. In some cases, audiovisual clips are retrieved using tags such as user-assigned hashtags or metadata. Pre-existing associations of such tags can be used as hints that certain audiovisual clips are likely to share correspondence with an audio signal encoding of a particular song or other audio baseline. Clips are evaluated for computationally determined correspondence with an audio baseline track. In general, comparisons of audio power spectra, of rhythmic features, tempo, pitch sequences and other extracted audio features may be used to establish correspondence. For clips exhibiting a desired level of correspondence, computationally determined temporal alignments of individual clips with the baseline audio track are used to prepare a coordinated audiovisual work that mixes the selected audiovisual clips with the audio track.

28 Claims, 4 Drawing Sheets

Related U.S. Application Data

(60) Provisional application No. 62/012,197, filed on Jun. 13, 2014, provisional application No. 61/736,503, filed on Dec. 12, 2012.

(51) Int. Cl.

| | | |
|---|---|---|
| *H04N 21/854* | (2011.01) | |
| *G11B 27/10* | (2006.01) | |
| *G06F 16/68* | (2019.01) | |
| *G10L 25/48* | (2013.01) | |
| *G06F 3/0481* | (2013.01) | |
| *H04N 21/414* | (2011.01) | |
| *G10L 25/54* | (2013.01) | |

(52) U.S. Cl.
CPC ............ *G11B 27/031* (2013.01); *G10L 25/54* (2013.01); *G10L 25/57* (2013.01); *H04N 21/41407* (2013.01); *H04N 21/854* (2013.01)

(58) Field of Classification Search
CPC ......... G10L 25/51; G10L 25/57; G11B 27/02; G11B 27/10; G11B 27/031; H04W 4/21; H04N 21/2665; H04N 21/854
USPC .................. 704/216, 218, 278; 386/285, 290
See application file for complete search history.

(56) References Cited

U.S. PATENT DOCUMENTS

| | | | | |
|---|---|---|---|---|
| 7,580,832 | B2* | 8/2009 | Allamanche | G10L 25/48 704/205 |
| 8,380,518 | B2* | 2/2013 | Kim | G10L 25/48 704/273 |
| 8,681,950 | B2* | 3/2014 | Vlack | G10L 25/54 379/88.01 |
| 8,818,276 | B2* | 8/2014 | Kiukkonen | H04W 4/80 455/41.2 |
| 8,831,760 | B2* | 9/2014 | Gupta | G10L 25/00 700/94 |
| 9,466,317 | B2* | 10/2016 | Bilobrov | G06F 17/30743 |
| 9,721,579 | B2* | 8/2017 | Cook | G10L 13/0335 |
| 9,886,962 | B2* | 2/2018 | Motta | G10L 19/018 |
| 9,966,112 | B1 | 5/2018 | Kulkarni | H04N 21/23418 |
| 10,089,994 | B1* | 10/2018 | Radzishevsky | G10L 25/18 |
| 10,262,644 | B2* | 4/2019 | Leistikow | G10L 21/00 |
| 10,290,307 | B2* | 5/2019 | Chordia | G10L 21/055 |
| 10,395,666 | B2* | 8/2019 | Cook | G10L 21/013 |
| 10,587,780 | B2* | 3/2020 | Godfrey | G10L 21/013 |
| 10,607,650 | B2* | 3/2020 | Chordia | G10L 21/055 |
| 2002/0082731 | A1 | 6/2002 | Pitman et al. | |
| 2006/0013565 | A1* | 1/2006 | Baumgartner | H04N 21/44008 386/201 |
| 2006/0075237 | A1* | 4/2006 | Seo | G11B 27/005 713/176 |
| 2007/0112837 | A1* | 5/2007 | Houh | G06F 17/30247 |
| 2007/0276670 | A1* | 11/2007 | Pearlstein | H04N 21/4341 704/270 |
| 2007/0297755 | A1* | 12/2007 | Holt | G11B 27/034 386/240 |
| 2009/0087161 | A1* | 4/2009 | Roberts | G11B 27/031 386/282 |
| 2009/0150902 | A1* | 6/2009 | Gisolfi | G06Q 30/06 719/311 |
| 2010/0064882 | A1* | 3/2010 | Miyajima | G10H 1/0025 84/625 |
| 2010/0118033 | A1* | 5/2010 | Faria | G10H 1/368 345/473 |
| 2010/0166382 | A1* | 7/2010 | Ogawa | H04H 20/18 386/207 |
| 2010/0274832 | A1* | 10/2010 | Gisolfi | G06F 17/3089 709/201 |
| 2011/0022589 | A1* | 1/2011 | Bauer | G06F 17/30855 707/723 |
| 2011/0126103 | A1* | 5/2011 | Cohen | G11B 27/034 715/716 |
| 2011/0154197 | A1 | 6/2011 | Hawthorne et al. | |
| 2011/0173214 | A1* | 7/2011 | Karim | G06F 17/3002 707/754 |
| 2012/0114310 | A1* | 5/2012 | Hymel | G11B 27/10 386/285 |
| 2012/0128334 | A1* | 5/2012 | Cheok | H04N 21/2665 386/278 |
| 2012/0265859 | A1* | 10/2012 | Zohar | G11B 27/10 709/219 |
| 2012/0323925 | A1* | 12/2012 | Fitzsimmons | G06F 17/30038 707/741 |
| 2013/0006625 | A1 | 1/2013 | Gunatilake et al. | |
| 2013/0132836 | A1 | 5/2013 | Ortiz | |
| 2013/0138673 | A1* | 5/2013 | Uemura | G06F 17/30038 707/758 |
| 2013/0254231 | A1 | 9/2013 | Decker et al. | |
| 2013/0295961 | A1* | 11/2013 | Lehtiniemi | H04W 4/21 455/456.3 |
| 2013/0300933 | A1* | 11/2013 | Thorson | H04N 21/4307 348/500 |
| 2014/0074855 | A1* | 3/2014 | Zhao | G06F 17/3002 707/746 |
| 2014/0237510 | A1* | 8/2014 | Phillips | G06F 17/3002 725/34 |
| 2014/0244607 | A1* | 8/2014 | Hedinsson | G06F 17/30781 707/705 |
| 2015/0095937 | A1* | 4/2015 | Tobin | G06F 17/30038 725/32 |
| 2015/0189402 | A1* | 7/2015 | Outtagarts | G06F 17/30843 386/282 |
| 2016/0005410 | A1* | 1/2016 | Parilov | G10L 25/54 704/500 |
| 2016/0330526 | A1* | 11/2016 | Marchetti | H04N 21/2665 |

* cited by examiner

COORDINATED AUDIOVISUAL MONTAGE FROM SELECTED CROWD-SOURCED CONTENT WITH ALIGNMENT TO AUDIO BASELINE

CROSS-REFERENCE TO RELATED APPLICATION(S)

The present application claims priority of U.S. Provisional Application No. 62/012,197, filed Jun. 13, 2014. In addition, the present application is a continuation-in-part of U.S. patent application Ser. No. 14/104,618, filed Dec. 12, 2013, now U.S. Pat. No. 9,459,768, issued Oct. 4, 2016, entitled "AUDIOVISUAL CAPTURE AND SHARING FRAMEWORK WITH COORDINATED USER-SELECTABLE AUDIO AND VIDEO EFFECTS FILTERS" and naming Chordia, Cook, Godfrey, Gupta, Kruge, Leistikow, Rae and Simon as inventors, which in turn claims priority of U.S. Provisional Application No. 61/736,503, filed Dec. 12, 2012. Each of the aforementioned applications is incorporated by reference herein.

BACKGROUND

1. Field of the Invention

The present invention relates generally to computational techniques including digital signal processing for audiovisual content and, in particular, to techniques whereby a system or device may be programmed to produce a coordinated audiovisual work from individual clips.

2. Description of the Related Art

Social media has, over the past decade, become an animating force for internet users and businesses alike. During that time, advanced mobile devices and applications have placed audiovisual capture in the hands of literally billions of users worldwide. At least in part as a result, the volume of audiovisual content amassed by users and, in some cases, posted to social networking sites and video sharing platforms has exploded. Audiovisual content repositories associated with video sharing services such as YouTube, Instagram, Vine, Flickr, Pinterest, etc. now contain huge collections of audiovisual content.

SUMMARY

Computational system techniques have been developed that provide new ways of connecting users through audiovisual content, particularly audiovisual content that includes music. For example, techniques have been developed that seek to connect people in one of the most authentic ways possible, capturing moments at which these people are experiencing or expressing themselves relative to a particular song or music and combining these moments together to form a coordinated audiovisual work. In some cases, captured moments take the form of video snippets posted to social media content sites. In some cases, expression takes the form of audiovisual content captured in a karaoke-style vocal capture session. In some cases, captured moments or expressions include extreme action or point of view (POV) video captured as part of a sporting contest or activity and set to music. Often (or even typically), the originators of these video snippets have never met and simply share an affinity for a particular song or music as a "backing track" to their lives.

In general, candidate audiovisual clips may be sourced from any of a variety of repositories, whether local or network-accessible. Candidate clips may be retrieved using tags such as user-assigned hashtags or metadata. In this way, pre-existing associations of such tags can be used as hints that certain audiovisual clips are likely to have correspondence with a particular song or other audio baseline. In some cases, tags may be embodied as timeline markers used to identify particular clips or frames within a larger audiovisual signal encoding. Whatever the technique for identifying candidate clips, a subset of such clips is identified for further processing based computationally determined correspondence with an audio baseline track. Typically, correspondence is determined by comparing computationally defined features of the audio baseline track with those computed for an audio track encoded in, or in association with, the candidate clip. Comparisons of audio power spectra, of rhythmic features, tempo, and/or pitch sequences and of other extracted audio features may be used to establish correspondence.

For clips exhibiting a desired level of correspondence with the audio baseline track, computationally determined temporal offsets of individual clips into the baseline audio track are used to prepare a new and coordinated audiovisual work that includes selected audiovisual clips temporally aligned with the audio track. In some cases, extracted audio features may be used in connection with computational techniques such as cross-correlation to establish the desired alignments. In some cases or embodiments, temporally localizable features in video content may also be used for alignment. The resulting composite audiovisual mix includes video content from selected ones of the audiovisual clips synchronized with the baseline audio track based on the determined alignments. In some cases, audio tracks of the selected audiovisual clips may be included in the composite audiovisual mix.

In some embodiments in accordance with the present invention(s), a method includes (i) retrieving computer readable encodings of plural audiovisual clips, the retrieved audiovisual clips having pre-existing associations with one or more tags; (ii) computationally evaluating correspondence of audio content of individual ones of the retrieved audiovisual clips with an audio baseline, the correspondence evaluation identifying a subset of the retrieved audiovisual clips for which the audio content thereof matches a least a portion of the audio baseline; (iii) for the retrieved audiovisual clips of the identified subset, computationally determining a temporal alignment with the audio baseline and, based on the determined temporal alignments, assigning individual ones of the retrieved audiovisual clips to positions along a timeline of the audio baseline; and (iv) rendering video content of the temporally-aligned audiovisual clips together with the audio baseline to produce a coordinated audiovisual work.

In some cases or embodiments, the method further includes presenting the one or more tags to one or more network-accessible audiovisual content repositories, wherein the retrieved audiovisual clips are selected from the one or more network-accessible audiovisual content repositories based on the presented one or more tags. In some cases or embodiments, at least some of the tags provide markers for particular content in an audiovisual content repository, and the retrieved audiovisual clips are selected based on the markers from amongst the content of represented in the audiovisual content repository.

In some cases or embodiments, the method further includes storing, transmitting or posting a computer readable encoding of the coordinated audiovisual work. The computational evaluation of correspondence of audio content of individual ones of the retrieved audiovisual clips with the audio baseline may, in some cases or embodiments, include (i) computing a first power spectrum for audio content of individual ones of the retrieved audiovisual clips; (ii) computing a second power spectrum for at least a portion of the audio baseline; and (iii) correlating the first and second power spectra. The computational determination of temporal alignment may, in some cases or embodiments, include cross-correlating audio content of individual ones of the retrieved audiovisual clips with at least a portion of the audio baseline. In some cases or embodiments, the audio baseline includes an audio encoding of a song.

In some cases or embodiments, the method further includes selection or indication, by a user at a user interface that is operably interactive with a remote service platform, of the tag and of the audio baseline; and responsive to the user selection or indication, performing one or more of the correspondence evaluation, the determination of temporal alignment, and the rendering to produce a coordinated audiovisual work at the remote service platform. In some cases or embodiments, the method further includes selection or indication of the tag and of the audio baseline by a user at a user interface provided on a portable computing device; and audiovisually rendering the coordinated audiovisual work to a display of the portable computing device.

In some cases or embodiments, the portable computing device is selected from the group of: a compute pad, a game controller, a personal digital assistant or book reader, and a mobile phone or media player. In some cases or embodiments, the tag includes an alphanumeric hashtag and the audio baseline includes a computer readable encoding of digital audio. In some cases or embodiments, either or both of the alphanumeric hashtag and the computer readable encoding of digital audio are supplied or selected by a user.

In some cases or embodiments, the retrieving of computer readable encodings of the plural audiovisual clips is based on correspondence of the presented tag with metadata associated, at a respective network-accessible repository, with respective ones of the audiovisual clips. In some cases or embodiments, a retrieved clip from one of the one or more network-accessible repositories stores includes an API-accessible, audiovisual clip service platform. In some cases or embodiments, a retrieved clip from one of the one or more network-accessible repositories stores serves short, looping audiovisual clips of about six (6) seconds or less. In some cases or embodiments, a retrieved clip from one of the one or more network-accessible repositories stores serves at least some audiovisual content of more than about six (6) seconds, and the method further includes segmenting at least some of the retrieved audiovisual content.

In some embodiments in accordance with present invention(s), one or more computer program products are encoded in one or more media. The computer program products together include instructions executable on one or more computational systems to cause the computational systems to collectively perform the steps of any one or more of the above-described methods. In some embodiments in accordance with present invention(s), one or more computational systems have instructions executable on respective elements thereof to cause the computational systems to collectively perform the steps of any one or more of the above-described methods.

In some embodiments in accordance with the present invention(s), an audiovisual compositing system includes a retrieval interface to computer readable encodings of plural audiovisual clips, a digital signal processor coupled to the retrieval interface and an audiovisual rendering pipeline. The retrieval interface allows selection of particular audiovisual clips from one or more content repositories based on pre-existing associations with one or more tags. The digital signal processor is configured to computationally evaluate correspondence of audio content of individual ones of the selected audiovisual clips with an audio baseline, the correspondence evaluation identifying a subset of the audiovisual clips for which audio content thereof matches a least a portion of the audio baseline. In addition, the digital signal processor is further configured to, for respective ones of the audiovisual clips of the identified subset, computationally determine a temporal alignment with the audio baseline and, based on the determined temporal alignments, assign individual ones of the audiovisual clips to positions along a timeline of the audio baseline. The audiovisual rendering pipeline is configured to produce a coordinated audiovisual work including a mix of at least (i) video content of the identified audiovisual clips and (ii) the audio baseline, wherein the mix is based on the computationally determined temporal alignments and assigned positions along the timeline of the audio baseline.

In some embodiments, the audiovisual compositing system further includes a user interface whereby a user selects the audio baseline and specifies the one or more tags for retrieval of particular audiovisual clips from the one or more content repositories. In some cases or embodiments, the tags include either or both of user-specified hashtags and markers for identification of user selected ones the audiovisual clips within an audiovisual signal encoding.

In some embodiments in accordance with the present invention(s), a computational method for audiovisual content composition includes accessing a plurality of encoding of audiovisual clips from computer readable storage, wherein the audiovisual clips includes coordinated audio and video streams, processing the audio and video streams in coordinated audio and video pipelines and rendering a coordinated audiovisual work. The processing of the audio and video streams is in coordinated audio and video pipelines, wherein coordination of the respective audio and video pipelines includes using, in the processing by the video pipeline, temporally localizable features extracted in the audio pipeline. The coordinated audiovisual work includes a mix of video content from the audiovisual clips and an audio baseline, wherein the mix is based on computationally determined temporal alignments and assigned positions for ones of the audiovisual clips along a timeline of the audio baseline. In some embodiments, the temporal alignments are based, at least in part, on a rhythmic skeleton computed from the audio baseline.

These and other embodiments, together with numerous variations thereon, will be appreciated by persons of ordinary skill in the art based on the description and claims.

BRIEF DESCRIPTION OF THE DRAWINGS

The present invention(s) is (are) illustrated by way of example and not limitation with reference to the accompanying figures, in which like references generally indicate similar elements or features.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION OF THE PREFERRED EMBODIMENT(S)

Figure 1:
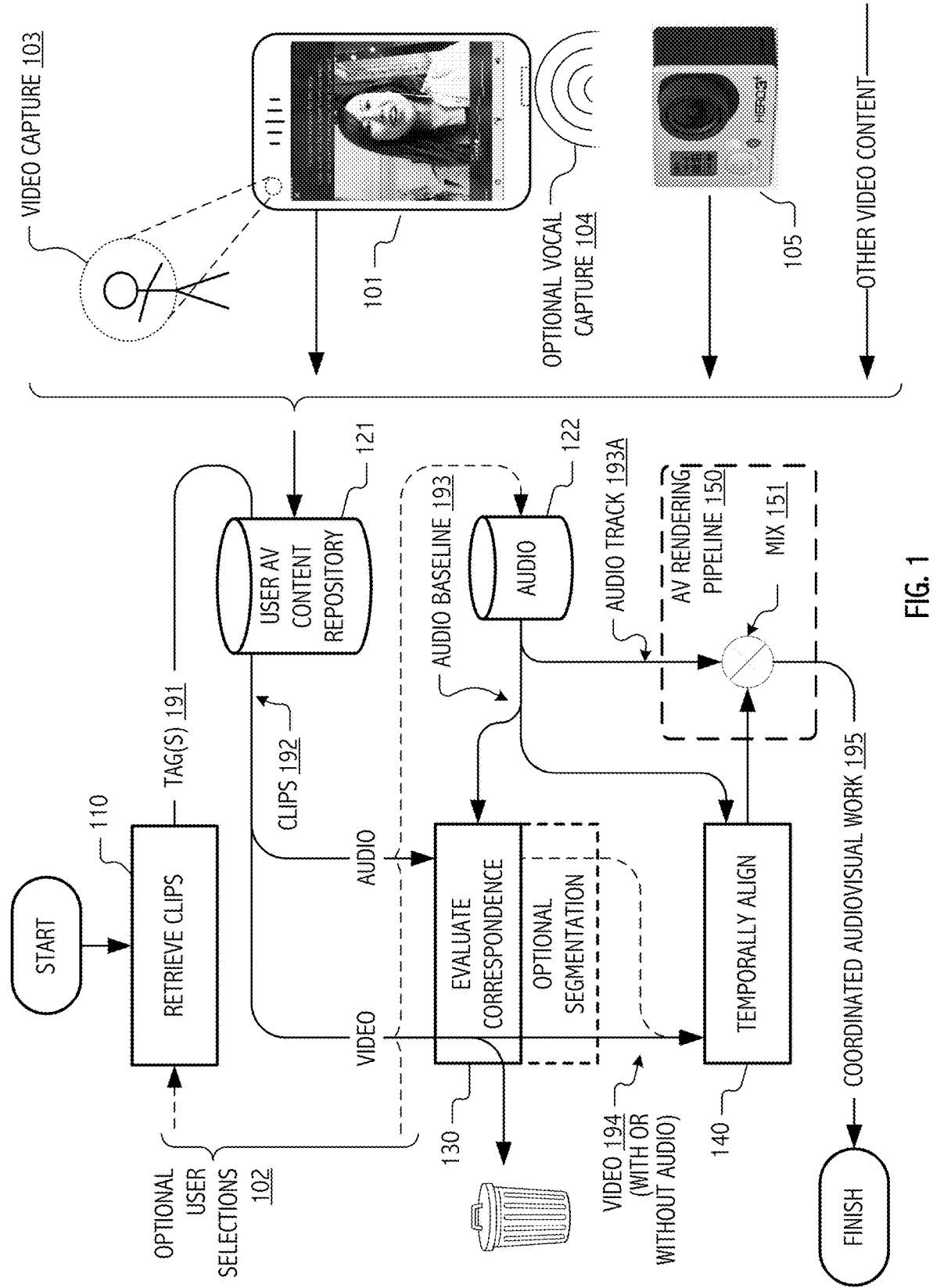
FIG. 1 depicts process flows in accordance with some embodiments of the present invention(s).

FIG. 1 depicts an exemplary process by which audiovisual clips 192 are retrieved (110) from an audiovisual content repository 121, evaluated (130) for correspondence with an audio baseline 193 such as an audio signal encoding for a song against which at least some of the audiovisual clips were recorded, and aligned (140) and mixed (151) with the audio baseline 193 to produce a coordinated audiovisual work 195. One or more tags 191 such as a hashtag, metadata or timeline markers are used to select candidate clips from available audiovisual content in repository 121. In general, a repository (or repositories) such as repository 121 includes audiovisual content sourced from any of a variety of sources including purpose-built video cameras 105, smartphones (101), tablets, webcams and audiovisual content (video 103 and vocals 104) captured as part of a karaoke-style vocal capture session.

Tags 191 and an audio baseline 193 selection may be specified (102) by a user. In some embodiments, repository 121 implements a hashtag-based retrieval interface and includes social media content such as audiovisual content associated with a short, looping video clip service platform. For example, exemplary computational system techniques and systems in accordance with the present invention(s) are illustrated and described using audiovisual content, repositories and formats typical of the Vine video-sharing application and service platform available from Twitter, Inc. Nonetheless, it will be understood that such illustrations and description are merely exemplary. Techniques of the present invention(s) may also be exploited in connection with other applications or service platforms. Techniques of the present invention(s) may also be integrated with existing video sharing applications or service platforms, as well as those hereafter developed.

Audio content of a candidate clip 192 is evaluated (130) for correspondence with the selected audio baseline 193. Correspondence is typically determined by comparing computationally defined features of the audio baseline 193 with those computed for an audio track encoded in, or in association with, a particular candidate clip 192. Suitable features for comparison include audio power spectra, rhythmic features, tempo, pitch sequences. For embodiments that operate on audiovisual content from a short, looping video clip service platform such as Vine, retrieved clips 192 may already be of a suitable length for use in preparation of a video montage. However, for audiovisual content of longer duration or to introduce some desirable degree of variation in clip length, optional segmentation may be applied. Segment lengths are, in general, matters of design- or user-choice.

For video content 194 from audiovisual clips 192 for which evaluation 130 has indicated audio correspondence, alignment (140) is performed, typically by calculating for each such clip, a lag that maximizes a correlation between the audio baseline 193 and an audio signal of the given clip. Temporally aligned replicas of video 194 (with or without audio) are then mixed (151) with audio track 193A to produce coordinated audiovisual work 195.

Figure 2:
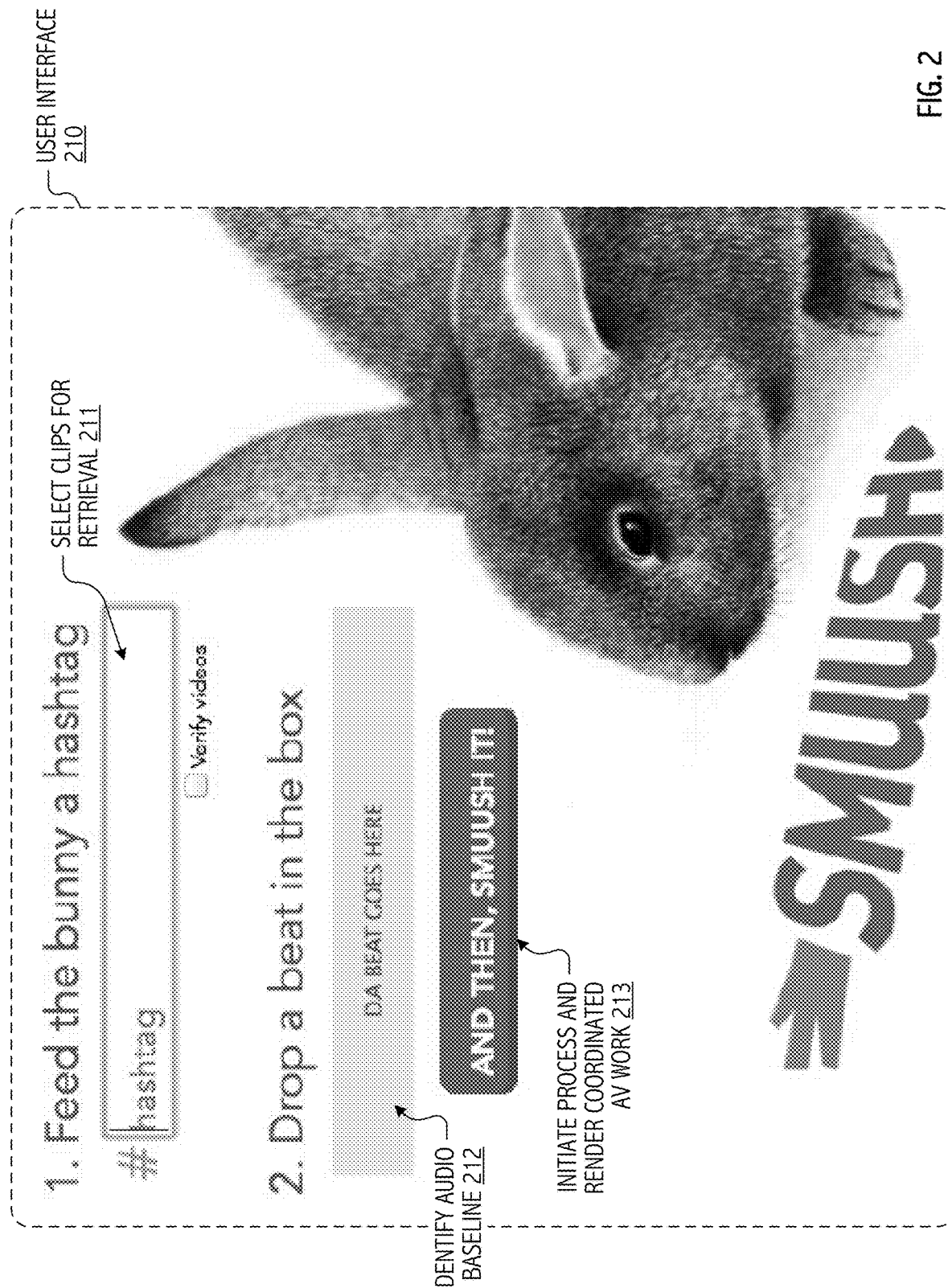
FIG. 2 is an illustrative user interface in accordance with some embodiments of the present invention(s) by which a user may specify a hashtag for retrieval of audiovisual clips and identify, using a drag-and-drop selection, an audio baseline against which audiovisual clips corresponding to the hashtag are to be aligned to produce a coordinated audiovisual work.

Referring now to FIG. 2, an application and backend service, developed by Smule Inc. as SMUUSH, provides a front-end user interface 210 and back-end processing for use in conjunction with video sharing services such as Vine (commonly accessed by users at a URL or using as applications for iOS and Android devices) using an application programmer interface (API) to access a repository of short, 6 second audiovisual clips that are easily searchable by hashtag. A user of the SMUUSH application identifies (212) an audio baseline, e.g., an mp3 encoding of a popular song (such as the song "Classic" by MKTO) and provides (211) a hashtag, e.g., a Vine hashtag (such as "#Classic") that users may have associated with video clips that are likely to relate to the audio baseline. Based on computational processing of the retrieved audiovisual clips and of the audio baseline (such as that described with reference to FIGS. 1 and 3, the SMUUSH application produces or provides a coordinated audiovisual work that, based on typically available crowd-sourced audiovisual clip content, includes people lip syncing, dancing to the beat, and otherwise expressing themselves in correspondence with song or music of the audio baseline.

Figure 3:
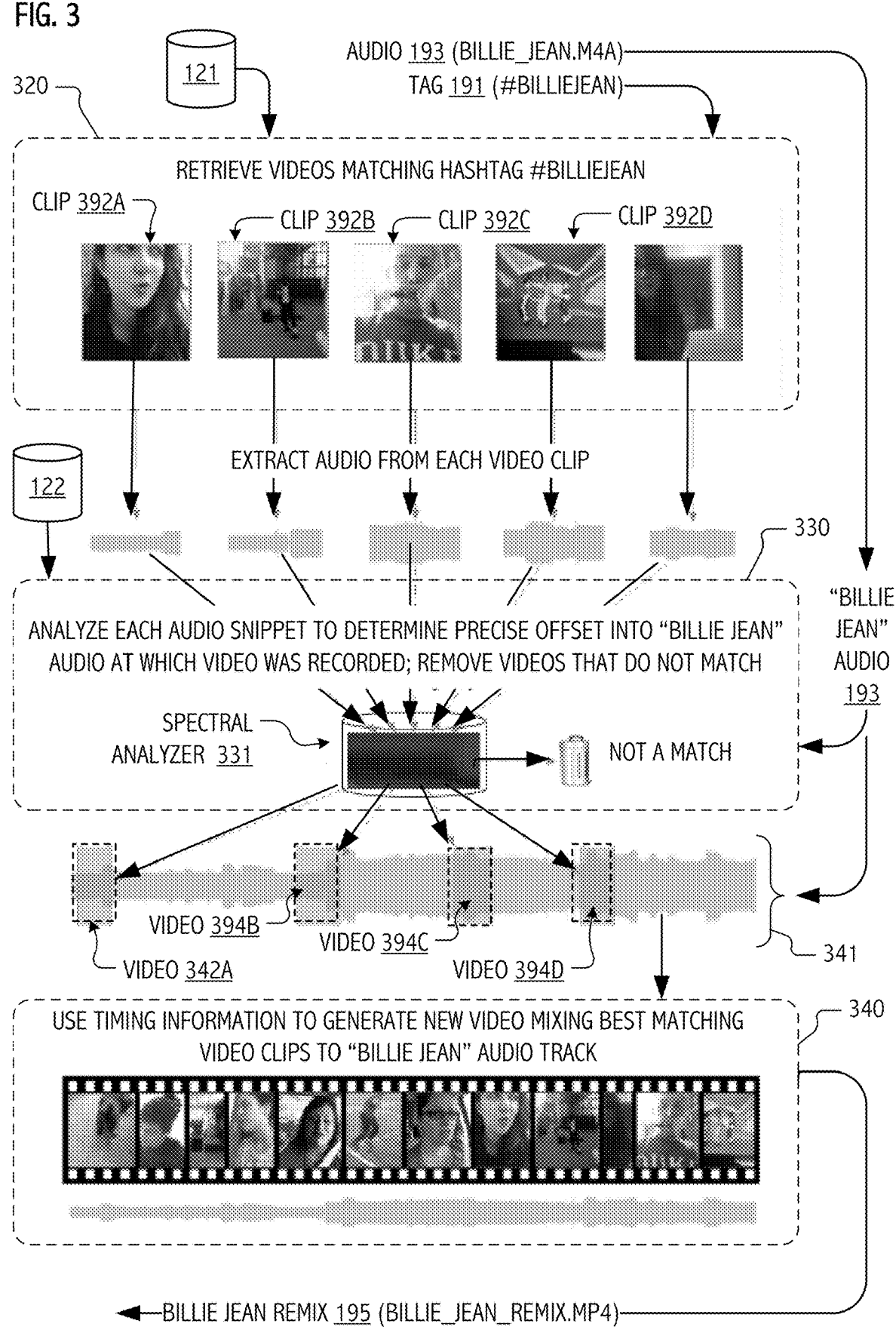
FIG. 3 illustrates a processing sequence by which a coordinated audiovisual work is prepared from an audio baseline track and crowd-sourced video content in accordance with some embodiments of the present invention(s).

FIG. 3 illustrates further (as a graphical flow) how an exemplary implementation of the technology works. Specifically, the SMUUSH application (itself and/or together with cooperative hosted service(s)) performs the following:

1) Search Vine for audiovisual clips associated with tag 191 (e.g., with the hashtag, #billiejean) and download 320 (or otherwise retrieve) computer readable encodings of such clips (e.g., clips 392A, 392B, 392C and 392D) from audiovisual content repository 121. In some cases, the application preferentially retrieves a most recently posted subset of audiovisual clips associated with the hashtag. However, in some embodiments, the application may retrieve as many audiovisual clips as possible (or a large, but capped number of audiovisual clips) and apply further selections.

2) Compute a spectral analysis (331) of an audio file, such as billie_jean.m4a, that constitutes the audio baseline 193. In some cases, it may be necessary to retrieve a suitable digital audio encoding of the audio baseline, such as from audio store 122; however, in some cases, suitable media content may exist locally. A variety of spectral analysis techniques will be appreciated by persons of skill in the art of audio signal processing. One example technique is to compute a first power spectrum for the audio baseline (and/or for segmentable portions thereof).

3) Compute a spectral analysis of the audiovisual clips 392A, 3928, 392C and 392D retrieved (or selected). A variety of spectral analysis techniques will be appreciated by persons of skill in the art of audio signal processing. One example technique is to compute, for individual ones of the retrieved audiovisual clips, a second plurality of power spectra.

4) Computationally correlate first and second power spectra to identify which of the audiovisual clips actually contain portions of the song or music that is represented by the audio 193 that constitutes the audio baseline.

5) Determine (330) proper (or candidate) temporal alignments of the individual audiovisual clips with the audio baseline. In some cases, such as with audiovisual clips that correspond to chorus or refrain, multiple temporal alignments may be possible. A variety of temporal alignment techniques will be appreciated by persons of skill in the art of audio signal processing. One example technique is to compute a cross-correlation of the audio signals or of extracted audio features, using delays that correspond to sufficiently distinct maxima in the cross-correlation function to compute aligning temporal offsets.

6) Place (340) the individual audiovisual clips along a timeline (341) of the audio baseline using the determined temporal alignments so that clips are presented in correspondence with the portion of the song or music against which they were recorded (or mixed).

7) Stitch the audiovisual content together by rendering a coordinated audiovisual work 195 (billie_jean.mp4) that synchronizes video content (394A, 394B, 394C and 394D) of the audiovisual clips with the audio baseline 193 and encodes the coordinated audiovisual work in computer readable digital form such as MPEG-4 format digital video or the like.

The resultant computer readable audiovisual encoding may be played, stored, transmitted and/or posted, including via network connected systems and devices such as illustrated in FIG. 3.

Figure 4:
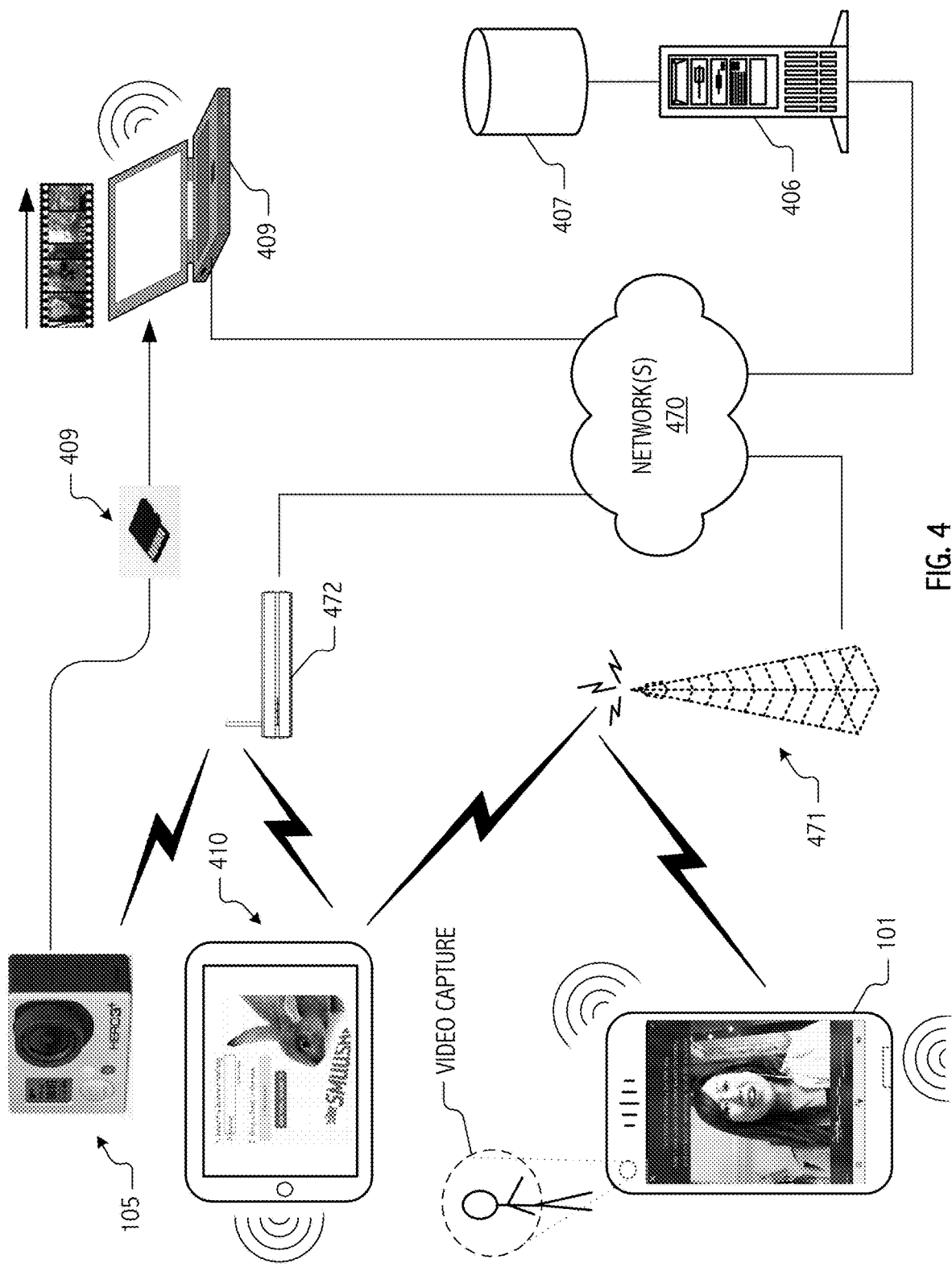
FIG. 4 is a network diagram that illustrates cooperation of exemplary devices in accordance with some embodiments of the present invention.

FIG. 4 is a network diagram that illustrates cooperation of exemplary devices in accordance with some embodiments of the present invention. In general, any of a variety of repositories of audiovisual content are contemplated, be they social media service platforms such as the Vine video sharing service exposed to client applications in network(s) 470, private servers (406) or cloud hosted service platforms that expose clips residing in an audiovisual content repository 407, or libraries of audiovisual content stored on, or available from, a computer 409, a portable handheld devices such as smartphone 101, a tablet 410, etc. Such content may be curated, posted with user applied tags, indexed, or simply raw with capture and/or originator metadata. In general, content in such repositories may be sourced from any of a variety of video capture platforms including portable computing devices (e.g., a smartphone 101, tablet 410 or webcam enabled laptop 409) that hosts native video capture applications and/or karaoke-style audio capture with performance synchronized video such as the Sing!™ application popularized by Smule, Inc. for iOS and Android devices. In some cases or embodiments, video content may be sourced from a high-definition digital camcorder 105, such as those popularized under the GoPro™ brand for extreme-action video photography, etc.

Functional flows and other implementation details depicted in FIGS. 1-3 and described elsewhere herein will be understood in the context of networks, device configurations and platforms and information interchange pathways such as those illustrated in FIG. 4. In addition, persons of skill in the art having benefit of the present application will appreciate suitably scaled, modified, alternative and/or extended infrastructure variations on the illustrative depictions of FIG. 4.

Other Embodiments

While the invention(s) is (are) described with reference to various embodiments, it will be understood that these embodiments are illustrative and that the scope of the invention(s) is not limited to them. Many variations, modifications, additions, and improvements are possible.

For example, while certain illustrative embodiments have been described in which each of the audiovisual clips are sourced from existing network-accessible repositories, persons of skill in the art will appreciate that capture and, indeed, transformation, filtering and/or other processing of such audiovisual clips may also be provided. Likewise, illustrative embodiments have, for simplicity of exposition, described temporal alignment techniques in terms of relatively simple audio signal processing operations. However, based on the description herein, persons of skill in the art will appreciate that more sophisticated feature extraction and correlation techniques may be for the identification and temporal alignment of audio and video.

For example, features computationally extracted from the video may be used to align or at least contribute an alignment with audio. Examples include temporal alignment based on visual movement computationally discernible in moving images (e.g., people dancing in rhythm) to align with a known or computationally determined beat of a reference backing track or other audio baseline. In this regard, computational facilities, techniques and general disclosure contained in commonly-owned, co-pending U.S. patent application Ser. No. 14/104,618, now U.S. Pat. No. 9,459,768, issued Oct. 4, 2016, entitled "AUDIOVISUAL CAPTURE AND SHARING FRAMEWORK WITH COORDINATED USER-SELECTABLE AUDIO AND VIDEO EFFECTS FILTERS" and naming Chordia et al. as inventors, are illustrative; application Ser. No. 14/104,618, now U.S. Pat. No. 9,459,768, issued Oct. 4, 2016, is incorporated herein by reference. Specifically, in some embodiments, temporally localizable features in the video content, such as a rapid change in magnitude or direction of optical flow, a rapid change in chromatic distribution and/or a rapid change in overall or spatial distribution of brightness, may contribute to (or be used in place of certain audio features) for temporal alignment with an audio baseline and/or segmentation of audiovisual content.

More generally, while certain illustrative signal processing techniques have been described in the context of certain illustrative applications, persons of ordinary skill in the art will recognize that it is straightforward to modify the described techniques to accommodate other suitable signal processing techniques and effects. Some embodiments in accordance with the present invention(s) may take the form of, and/or be provided as, a computer program product encoded in a machine-readable medium as instruction sequences and other functional constructs of software tangibly embodied in non-transient media, which may in turn be executed in computational systems (such as, network servers, virtualized and/or cloud computing facilities, iOS or Android or other portable computing devices, and/or combinations of the foregoing) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible, non-transient storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
    capturing vocal audio and performance synchronized video using a karaoke application executable on a portable computing device;
    retrieving computer readable encodings of audiovisual clips, wherein at least some of the retrieved audiovisual clips constitute a crowd-sourced candidate set and are sourced from one or more social media content repositories, and wherein at least one of the retrieved audiovisual clips includes audiovisual content captured in a karaoke vocal capture session using the karaoke application;
    computationally evaluating correspondence of audio content of individual ones of the retrieved audiovisual clips with an audio baseline, the correspondence evaluation identifying a subset of the retrieved audiovisual clips for which the audio content thereof matches at least a portion of the audio baseline;
    for the retrieved audiovisual clips of the identified subset, computationally determining a temporal alignment with the audio baseline and, based on the determined temporal alignments, assigning individual ones of the retrieved audiovisual clips to positions along a timeline of the audio baseline, wherein at least some of the determined temporal alignments are based on visual features computationally extracted from, and temporally localizable in, video content of respective ones of the retrieved audiovisual clips to align with a computationally determined beat of the audio baseline, wherein at least one of the retrieved audiovisual clips has multiple determined temporal alignments, and wherein a tag associated with the retrieved audiovisual clips includes an alphanumeric hashtag; and
    rendering video content of the temporally-aligned audiovisual clips together with the audio baseline to produce a coordinated audiovisual work.

2. The method of claim 1, further comprising:
    presenting one or more tags to one or more network-accessible audiovisual content repositories,
    wherein the retrieved audiovisual clips have pre-existing associations with the one or more tags,
    wherein the retrieved audiovisual clips are selected from the one or more network-accessible audiovisual content repositories based on the presented one or more tags.

3. The method of claim 2,
    wherein a retrieved-from one of the one or more network-accessible repositories stores includes an application programmer interface accessible (API-accessible), audiovisual clip service platform.

4. The method of claim 3,
    wherein a retrieved from one of the one or more network-accessible repositories stores serves short, looping audiovisual clips of about six (6) seconds or less.

5. The method of claim 3,
    wherein a retrieved-from one of the one or more network-accessible repositories stores serves at least some audiovisual content of more than about six (6) seconds, and
    wherein the method further includes segmenting at least some of the retrieved audiovisual content.

6. The method of claim 1,
    wherein the retrieved audiovisual clips have pre-existing associations with one or more tags,
    wherein at least some of the tags provide markers for particular content in an audiovisual content repository, and
    wherein the retrieved audiovisual clips are selected based on the markers from amongst the content of represented in the audiovisual content repository.

7. The method of claim 1, further comprising:
    storing, transmitting or posting a computer readable encoding of the coordinated audiovisual work.

8. The method of claim 1, wherein the computational determination of temporal alignment includes:
    cross-correlating audio content of individual ones of the retrieved audiovisual clips with at least a portion of the audio baseline.

9. The method of claim 1,
    wherein the audio baseline includes an audio encoding of a song.

10. The method of claim 1, further comprising:
    selection or indication, by a user at a user interface that is operably interactive with a remote service platform, of a tag associated with the retrieved audiovisual clips and of the audio baseline; and
    responsive to the user selection or indication, performing one or more of the correspondence evaluation, the determination of temporal alignment, and the rendering to produce a coordinated audiovisual work at the remote service platform.

11. The method of claim 1, further comprising:
    selection or indication of a tag associated with retrieved audiovisual clips and of the audio baseline by a user at a user interface provided on a portable computing device; and
    audiovisually rendering the coordinated audiovisual work to a display of the portable computing device.

12. The method of claim 11, wherein the portable computing device is selected from the group of:
    a compute pad;
    a game controller;
    a personal digital assistant or book reader; and
    a mobile phone or media player.

13. The method of claim 1,
    wherein the audio baseline includes a computer readable encoding of digital audio.

14. The method of claim 13,
    wherein either or both of the alphanumeric hashtag and the computer readable encoding of digital audio are supplied or selected by a user.

15. The method of claim 1,
    wherein the retrieving of computer readable encodings of the plural audiovisual clips is based on correspondence of a presented tag with metadata associated, at a respective repository, with respective ones of the audiovisual clips.

16. One or more non-transitory computer program products encoded in one or more non-transitory media, the computer program products together including instructions executable on one or more computational systems to cause the computational systems to collectively perform the steps recited in claim 1.

17. One or more computational systems with instructions executable on respective elements thereof to cause the computational systems to collectively perform the steps recited in claim 1.

18. The method of claim 1, wherein the computational determinations of temporal alignments are based, at least in part, on a rhythmic skeleton computed from the audio baseline.

19. The method of claim 1, wherein at least some of the visual features computationally extracted from, and temporally localizable in, video content of respective ones of the retrieved audiovisual clips are based on rhythmic visual movement computationally discernible in moving images.

20. The method of claim 1, wherein at least some of the visual features computationally extracted from, and temporally localizable in, video content of respective ones of the retrieved audiovisual clips are based on rapid change in magnitude or direction of optical flow.

21. The method of claim 1, wherein at least some of the visual features computationally extracted from, and temporally localizable in, video content of respective ones of the retrieved audiovisual clips are based on one or more of:
rapid change in chromatic distribution,
rapid change in overall distribution of brightness, and
rapid change in spatial distribution of brightness in the video content.

22. An audiovisual compositing system comprising:
a portable computing device for capturing vocal audio and performance synchronized video using a karaoke application executable thereon;
a retrieval interface to computer readable encodings of plural audiovisual clips, wherein the retrieval interface allows selection of audiovisual clips from one or more social media content repositories, and wherein at least one of the selected audiovisual clips includes audiovisual content captured in a karaoke vocal capture session using the karaoke application;
a digital signal processor coupled to the retrieval interface and configured to computationally evaluate correspondence of audio content of individual ones of the selected audiovisual clips with an audio baseline, the correspondence evaluation identifying a subset of the audiovisual clips for which audio content thereof matches at least a portion of the audio baseline;
the digital signal processor further configured to, for respective ones of the audiovisual clips of the identified subset, computationally determine a temporal alignment with the audio baseline and, based on the determined temporal alignments, assign individual ones of the audiovisual clips to positions along a timeline of the audio baseline, wherein at least some of the determined temporal alignments are based on visual features computationally extracted from, and temporally localizable in, video content of respective ones of the retrieved audiovisual clips to align with a computationally determined beat of the audio baseline, wherein at least one of the audiovisual clips of the identified subset has multiple determined temporal alignments, and wherein the retrieved audiovisual clips have pre-existing associations with hashtags; and
an audiovisual rendering pipeline configured to produce a coordinated audiovisual work including a mix of at least (i) video content of the identified audiovisual clips and (ii) the audio baseline, wherein the mix is based on the computationally determined temporal alignments and assigned positions along the timeline of the audio baseline.

23. The audiovisual compositing system of claim 22, further comprising:
a user interface whereby a user selects the audio baseline and specifies one or more tags for retrieval of particular audiovisual clips from the one or more content repositories.

24. The audiovisual compositing system of claim 22, wherein the retrieved audiovisual recordings have pre-existing associations with either or both of the hashtags and markers for identification of user-selected ones of the audiovisual clips within an audiovisual signal encoding.

25. The audiovisual compositing system of claim 22, wherein the computationally determined temporal alignments are based, at least in part, on a rhythmic skeleton computed from the audio baseline.

26. The audiovisual compositing system of claim 22, wherein at least some of the visual features computationally extracted from, and temporally localizable in, video content of respective ones of the retrieved audiovisual clips are based on rhythmic visual movement computationally discernible in moving images.

27. The audiovisual compositing system of claim 22, wherein at least some of the visual features computationally extracted from, and temporally localizable in, video content of respective ones of the retrieved audiovisual clips are based on rapid change in magnitude or direction of optical flow.

28. The audiovisual compositing system of claim 22, wherein at least some of the visual features computationally extracted from, and temporally localizable in, video content of respective ones of the retrieved audiovisual clips are based on one or more of:
rapid change in chromatic distribution,
rapid change in overall distribution of brightness, and
rapid change in spatial distribution of brightness in the video content.

* * * * *